(12) United States Patent
Diehl

(10) Patent No.: US 7,631,901 B2
(45) Date of Patent: Dec. 15, 2009

(54) TANK ASSEMBLY FOR ALTERNATIVE FUEL VEHICLES

(75) Inventor: Johannes Diehl, Saulheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 404 days.

(21) Appl. No.: 11/460,285

(22) Filed: Jul. 27, 2006

(65) Prior Publication Data

US 2008/0023957 A1  Jan. 31, 2008

(51) Int. Cl.
*B60P 3/22* (2006.01)
(52) U.S. Cl. ....................... 280/834; 414/462
(58) Field of Classification Search ............. 280/834
See application file for complete search history.

(56) References Cited

U.S. PATENT DOCUMENTS

| | | | |
|---|---|---|---|
| 2,777,591 A | 1/1957 | Manzatuik | |
| 4,025,080 A | 5/1977 | Gedeon | |
| 4,059,281 A * | 11/1977 | Evans | 280/834 |
| 4,621,822 A | 11/1986 | Knochelmann et al. | |
| 4,770,428 A * | 9/1988 | Sugiyama | 280/834 |
| 5,405,234 A * | 4/1995 | Ziaylek et al. | 414/462 |
| 6,086,312 A * | 7/2000 | Ziaylek et al. | 414/462 |
| 6,641,169 B2 * | 11/2003 | Fukunaga et al. | 280/835 |
| 6,692,028 B2 | 2/2004 | Koster | |
| 6,830,226 B2 * | 12/2004 | Field et al. | 248/313 |
| 6,863,198 B1 * | 3/2005 | Darby | 224/403 |
| 7,147,424 B2 * | 12/2006 | Weaver | 414/684.3 |
| 2003/0189334 A1 * | 10/2003 | Kawasaki et al. | 280/834 |
| 2005/0258630 A1 * | 11/2005 | Choi | 280/834 |

FOREIGN PATENT DOCUMENTS

DE   3724601 C2   2/1988

* cited by examiner

*Primary Examiner*—Lesley D Morris
*Assistant Examiner*—Tashiana Adams

(57) ABSTRACT

One embodiment may include a tank assembly having a tank housing, a lever, and a release feature. The lever may be hinged at a first point to the tank housing and may be constructed to be hinged at a second point to a vehicle structure. The release feature holds and releases the tank housing from a first position and to a second position. The release feature may include a clamping mechanism to clamp and unclamp a catch, and a keeper to hold and release another catch.

16 Claims, 2 Drawing Sheets

TANK ASSEMBLY FOR ALTERNATIVE FUEL VEHICLES

TECHNICAL FIELD

The disclosure generally relates to tank assemblies for alternative fuel vehicles and methods for such tank assemblies.

BACKGROUND

Tank assemblies for alternative fuel vehicles such as hydrogen vehicles, natural gas vehicles, propane vehicles, or the like, can be located at the rear of the vehicle. Here, the tank assemblies could be vulnerable during an impact in the rear.

SUMMARY OF EXEMPLARY EMBODIMENTS OF THE INVENTION

One embodiment of the invention may include a tank assembly comprising a tank housing, a lever, and a release feature. The lever may be attached at a first point to the tank housing and at a second point to a vehicle structure. The release feature may hold the tank housing in a first position, and releases it to a second position.

Another embodiment of the invention may include a product comprising a tank housing, at least one lever, and at least one catch. The tank housing carries at least one tank containing pressurized hydrogen. The lever may be hinged at a first point and is constructed to be hinged at a second point. The catch extends from the tank housing and is constructed to be clamped and unclamped by a clamping mechanism.

Another embodiment of the invention may include a method comprising providing a tank housing, holding it, and releasing it. The tank housing is held in a first position, and is released to a second position.

Other embodiments of the invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of embodiment(s) is merely exemplary in nature and is in no way intended to limit the invention, its application, or uses.

Figure 1:
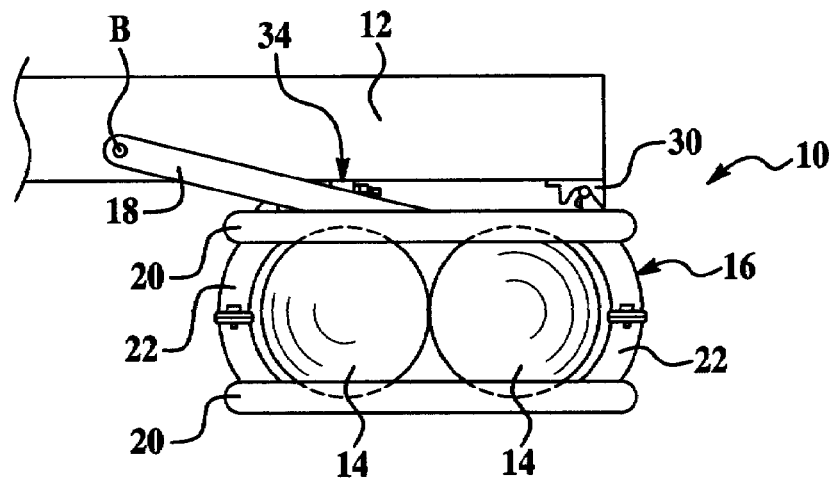
FIG. 1 is a side view of a tank assembly in a first position according to one embodiment of the invention.
Figure 2:
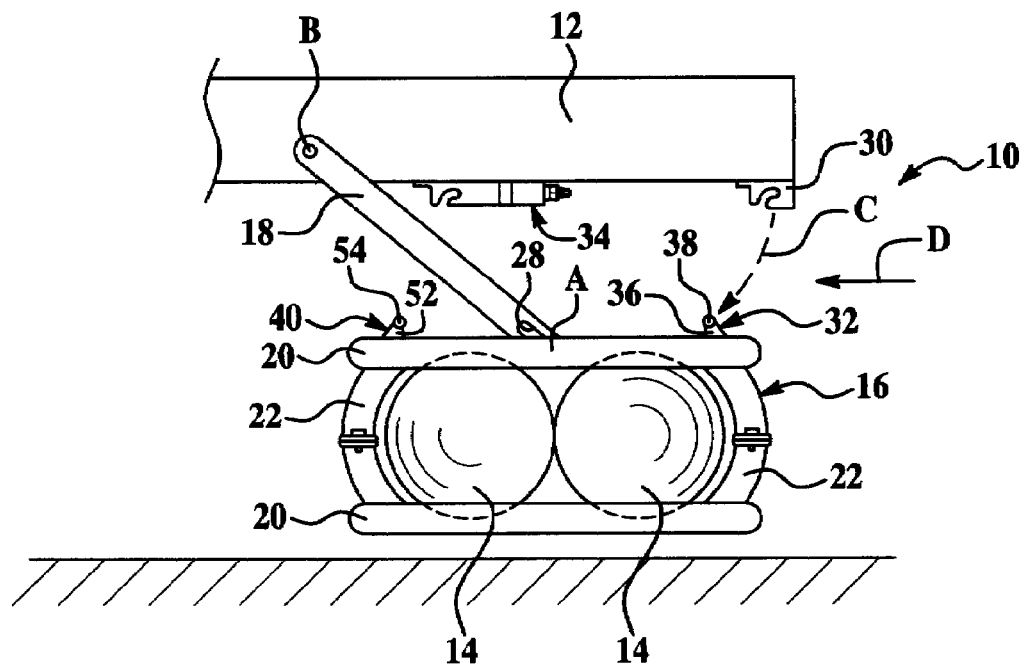
FIG. 2 is a side view of the tank assembly of FIG. 1 in a second position.
Figure 3:
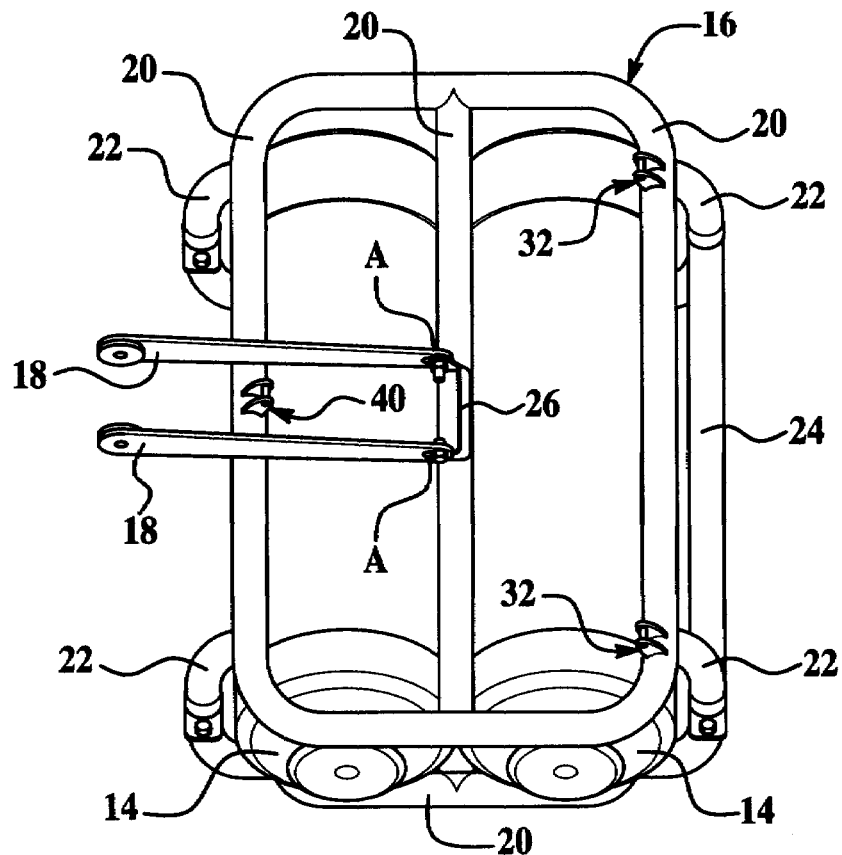
FIG. 3 is a perspective view of the tank assembly of FIG. 1.

The figures illustrate an embodiment of a tank assembly 10 used in an alternative fuel vehicle such as a hydrogen fuel cell automobile. The term "vehicle" covers other self-propelled vehicles like buses, motorcycles, snowmobiles, or the like. FIGS. 1-3 illustrate one embodiment of the tank assembly 10 installed in the rear of the automobile to a vehicle structure such as an automobile frame 12. The tank assembly 10 is constructed to hold at least one tank 14 in a first position, and release it to a second position spaced away from the first position upon vehicle impact. The tank assembly 10 comprises a tank housing 16 to carry the at least one tank 14, a lever 18, and a release feature.

Referring to FIG. 3, the tank housing 16 is constructed to carry at least one tank 14, which may include pressurized hydrogen. The tank housing 16 may carry a single tank 14 or two or more tanks 14 as shown. In one embodiment of the invention, the tank housing 16 may be shaped as a cage that at least partly surrounds the tanks 14. The cage shape may be made up of a number of bars including top and bottom bars 20 that form the cage's top and bottom structures, curved bars 22 that form the cage's side structures, and a side bar 24 that reinforces a side of the tank housing 16. In various embodiments, these bars 20, 22, and 24 may be constructed from a material including a metal such as aluminum or steel, or a polymeric or composite material, or the like. The cage may be made up of two halves that are bolted together, but the cage could be formed as one-piece, or as several pieces that are later attached.

Referring to FIGS. 1-3, in one embodiment of the invention, the lever 18 pivots the tank housing 16 about a second point B on the frame 12, the second point defining the fulcrum for the lever 18. This pivoting can be achieved in a number of ways including one with a pair of the levers 18 as shown. Looking at just one lever, the lever 18 is attached by hinging at the second point B. The lever 18 may also be attached by hinging at a first point A to the tank housing 16, for example, to a bracket 26. The bracket 26 may be attached by welding to one of the top bars 20 generally centered between the tanks 14. The lever 18 may be attached to the bracket 26 with a bolt and nut extending through a slot 28 formed in the lever 18. In various embodiments, the lever 18 may be constructed from a material including a metal such as aluminum or steel, or a polymeric or composite material, or the like to form a rigid body extending from a first end at the first point A to a second end at the second point B. In one embodiment, the end-to-end length of the lever 18 is about 350 mm, and the fulcrum is located at a point on the frame 12 to create an angle of incidence (angle between the long axis of the lever 18 and an axis of the frame 12 in the view of FIG. 1) of about 7.5° when the tank housing 16 is in the first position. In other embodiments, the lever 18 may comprise several parts where the tank housing 16 would pivot about a point on one of those parts, or the lever 18 may be omitted altogether where the tank housing 16 would pivot alone about the second point B.

The release feature holds the tank housing 16 to the frame 12 in the first position, and releases the tank housing 16 below the frame 12 in the second position. The release feature is designed to do so upon impact in the rear of the automobile. This may be achieved in a number of ways including one with a pair of keepers 30, a pair of catches 32, and a clamping mechanism 34. The keepers 30 may be each constructed to have a one-piece body with an opening to receive the catches 32. In various embodiments, the element 30, 32 and 34 may be constructed from a material including a metal such as aluminum or steel, or a polymeric or composite material, or the like. The keepers 30 may be attached by bolting to, and extend from, the bottom surface of the frame 12; and they may be attached by welding, or the like, or formed unitary with the frame 12. When attached, the keepers 30 are aligned with the catches 32 when the tank housing 16 is in the first position. The catches 32 are shaped complementary to the keepers 30. Each one includes a bracket 36 and a pin 38 extending therebetween. In various embodiments, both the bracket 36 and pin 38 may be constructed from a material including a metal such as aluminum or steel, or a polymeric or composite material, or the like. The catches 32 may be attached by welding to, and extend from, the top surface of the top bars 20; and they could be attached by bolting, or the like, or formed unitary with the top bars 20. In other embodiments, these keepers 30 and catches 32 may be break-away parts that break when their breaking force is exceeded.

Figure 4:
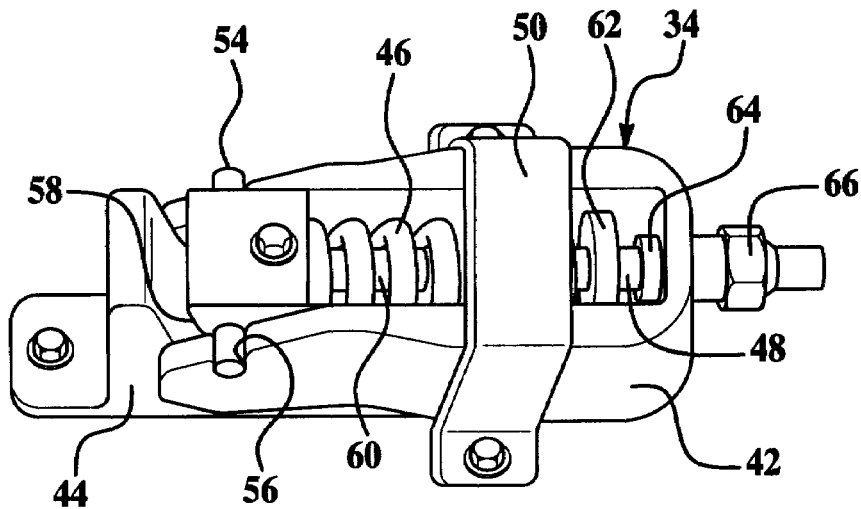
FIG. 4 is a perspective view of a clamping mechanism that is used with the tank assembly of FIG. 1.

Referring to FIGS. 2 and 4, the clamping mechanism 34 clamps and unclamps a catch 40 upon impact in the rear of the automobile. This may be achieved in a number of ways including one with a housing 42, a keeper 44, a spring 46, a bolt 48, and a retainer 50. These parts may be attached to the frame 12 to be aligned with the catch 40. The catch 40 may be similar to the catches 32, but includes a bracket 52 and a pin 54 slanted in an opposite direction. Referring to FIG. 4, the housing 42 houses the spring 46 and partly holds the pin 54 in the keeper 44 when the clamping mechanism 34 is clamped. The housing 42 may be one-piece with a general U-shape having a depression 56 oppositely disposed on each side of its shape, and having a hole at one end to fit the bolt 48. In various embodiments the housing 42 may be constructed from a material including a metal such as aluminum or steel, or a polymeric or composite material, or the like. The depressions 56 are shaped to retain the pin 54 so that the pin 54 is nested in the keeper 44 when the clamping mechanism 34 is clamped. The keeper 44 may be similar to the keepers 30. It has a one-piece body with an opening 58 to receive the pin 54, and a stud 60 extending from the rear wall of the keeper 44 to support the spring 46. The keeper 44 may be attached by bolting to, and extends from, the bottom surface of the frame 12; or the keeper 44 may be attached by welding or the like, or formed unitary with the frame 12.

As mentioned, the spring 46 is housed in the housing 42. The spring 46 provides a clamping force that clamps and holds the catch 40. The clamping force yields to a greater impact force exerted on the tank housing 16 upon impact in the rear of the automobile to unclamp and release the catch 40. In one embodiment, the spring 46 may have a spring rate of 389 N/mm. The spring 46 bears against the rear wall of the keeper 44 to emit the clamping force through the bolt 48 and to the housing 42 that biases the housing 42 away from the keeper 44. The bolt 48 supports the spring 46. About midway down its body, the bolt 48 has a radially expanding flange 62 that receives the clamping force from the spring 46. The bolt 48 slides through a sleeve 64 that sits in the hole of the housing 42. On the other side of the sleeve 64, a nut 66 is threaded on the bolt 48. Lastly, the retainer 50 keeps the housing 42 against the frame 12. The retainer 50 may be an aluminum piece extending over the housing 42 and may be attached by bolting to the frame 12. And like other parts, the retainer 50 may be constructed from a material including a metal such as aluminum or steel, or a polymeric or composite material, or the like and could be attached by welding or the like. The retainer 50 fits loosely over the housing 42 so that the housing 42 can slide back and forth underneath it.

Referring to FIG. 1, in use, the tank assembly 10 is installed on the frame 12 in the rear of the automobile. The tank assembly 10 is held in the first position against the frame 12 by the release feature. The catches 32 are held in respective keepers 30, and the clamping mechanism 34 clamps the catch 40. Referring to FIG. 2, when another vehicle impacts the automobile generally from a driving direction D, the impact force causes the release feature to release the tank housing 16. For example, the side bar 24 (FIG. 3) can receive the impact force and thus emit that force to the tank housing 16. If the impact force is greater than the clamping force, the tank housing 16 is thrust forward in the driving direction D. Simultaneously, the catches 32 are disengaged from the keepers 30, the bracket 26 and its nuts and bolts are slid forward in the slot 28, and the clamping mechanism 34 unclamps the catch 40. In other words, the catch 40 pulls the housing 42 forward underneath the retainer 50 while the spring 46 yields to the impact force. As this happens, the pin 54 escapes out of the depressions 56 and out of the opening 58. In the end, the tank housing 16 is released from the first position and travels to the second position along a swinging path C where it hangs below the frame 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A product comprising:
   a tank assembly comprising a tank housing with a bracket;
   a lever having a slot and being attached at a first point to the tank housing via the bracket being inserted in the slot, and being attached at a second point to a vehicle structure;
   a catch attached to the tank housing; and
   a release feature holding the tank housing to the vehicle structure where the tank housing is in a first position, and being constructed and arranged to release the tank housing to a second position spaced a predetermined distance from the first position upon an external impact force being exerted to the tank housing, wherein the release feature includes a keeper, a housing, and a spring positioned between the keeper and the housing and biasing the housing away from the keeper, the keeper having an opening, the housing having a depression, wherein, in the first position, the catch is received in the opening and in the depression and is kept therein by way of the spring biasing the housing away from the keeper, and wherein, upon the external impact force, the bracket slides in the slot and simultaneously the spring yields to the external impact force and the catch escapes out of the opening and out of the depression thereby releasing the tank housing to the second position.

2. A product as set forth in claim 1 wherein the tank housing is constructed to carry at least one tank containing pressurized hydrogen.

3. A product as set forth in claim 1 wherein the lever is hinged at the first point, and hinged at a second point defining the lever's fulcrum.

4. A product as set forth in claim 3 wherein when released, the tank housing travels from the first position and to the second position along a swinging path about the lever's fulcrum.

5. A product as set forth in claim 1 wherein when in the first position, the tank housing is held against the vehicle structure, and when in the second position, the tank housing hangs below the vehicle structure.

6. A product comprising:
   a tank housing constructed to carry at least one tank containing pressurized hydrogen and having a bracket;
   at least one lever having a slot and being hinged at a first point on the tank housing via the bracket being inserted in the slot, and the at least one lever being constructed to be hinged at a second point on a vehicle structure;
   a clamping mechanism constructed to be attached to the vehicle structure, the clamping mechanism including at least one keeper, a housing, and a spring bearing against the at least one keeper and biasing the housing away from the at least one keeper; and at least one catch extending from the tank housing constructed to be clamped and unclamped by the clamping mechanism;

wherein the at least one catch is held in the at least one keeper via the housing and a biasing force emitted by the spring, and wherein, in use, the at least one catch being unclamped by the clamping mechanism upon an external impact force being exerted to the tank housing that is greater than the biasing force, upon the external impact force the bracket slides in the slot in the general direction of the lengthwise dimension of the at least one lever, and simultaneously upon the external impact force the at least one catch pulls the housing toward the at least one keeper which remains stationary while the spring yields to the impact force as the housing compresses the spring against the at least one keeper, the housing slides toward the at least one keeper and the at least one catch is released out of the at least one keeper.

7. A product as set forth in claim 6 wherein the tank housing is constructed as a cage that at least partly surrounds the at least one tank.

8. A product as set forth in claim 7 wherein the tank housing has a side bar constructed to receive the impact force.

9. A product as set forth in claim 6 wherein the at least one lever is a pair of levers each hinged on a bracket extending from the tank housing.

10. A product as set forth in claim 6 further comprising a pair of catches extending from the tank housing that are constructed to be held by a pair of keepers.

11. A method comprising:

providing a tank housing with a bracket and a catch attached to the tank housing, and a lever with a slot attached to the tank housing via the bracket being inserted in the slot; holding the tank housing;

in a first position with respect to a vehicle structure by way of the catch, a keeper, a housing, and a spring, the keeper being fixedly attached to the vehicle structure, the housing being loosely attached to the vehicle structure, the spring being positioned between the keeper and the housing and biasing the housing away from the keeper, the catch being kept in the keeper via the housing being biased away from the keeper; and releasing the tank housing from the first position so that the tank housing swings to a second position spaced a predetermined distance from the first position upon an external impact force being exerted to the tank housing, upon the external impact force the bracket slides in the slot and simultaneously the catch pulls the housing and the housing slides toward the keeper as the spring yields to the external impact force, and the catch then escapes out of the keeper and the tank housing swings to the second position.

12. A method as set forth in claim 11 further comprising pivoting the tank housing to the vehicle structure.

13. A method as set forth in claim 11 further providing at least one tank containing pressurized hydrogen carried by the tank housing.

14. A method as set forth in claim 11 comprising clamping the tank housing in the first position where it is held against the vehicle structure, and unclamping the tank housing to the second position where it hangs below the vehicle structure.

15. A product as set forth in claim 1 wherein the keeper is fixedly attached to the vehicle structure and the housing is held loosely against the vehicle structure via a retainer, and wherein, upon the external impact force, the catch pulls the housing and the housing slides toward the keeper as the spring yields to the external impact force, and the catch escapes out of the opening and out of the depression.

16. A product as set forth in claim 6 wherein the at least one keeper has an opening and the housing has a depression, the at least one catch being received in the opening and in the depression when the at least one catch is clamped in the clamping mechanism.

* * * * *